United States Patent [19]

Hunter et al.

[11] Patent Number: 5,129,923
[45] Date of Patent: Jul. 14, 1992

[54] OIL COALESCING FILTER AND FILTERING PROCESS

[75] Inventors: George S. Hunter, Richmond; Andrew G. Chalmers, Bowburn, both of United Kingdom

[73] Assignee: Process Scientific Innovations limited, Bowburn, England

[21] Appl. No.: 780,381

[22] Filed: Oct. 23, 1991

Related U.S. Application Data

[63] Continuation of Ser. No. 555,457, filed as PCT/GB89/00182, Feb. 16, 1989, abandoned.

[30] Foreign Application Priority Data

Feb. 17, 1988 [GB] United Kingdom ............... 8803716

[51] Int. Cl.⁵ ..................... B01D 37/02; B01D 39/14
[52] U.S. Cl. ............................. 55/97; 55/316; 55/387; 55/486; 55/512; 55/524; 55/527; 210/504
[58] Field of Search ............... 55/97, 179, 316, 387, 55/486, 512, 524, 527, 487; 210/504, 505

[56] References Cited

U.S. PATENT DOCUMENTS

| | | | |
|---|---|---|---|
| 3,791,105 | 2/1974 | Rhodes | 55/97 |
| 3,891,417 | 6/1975 | Wade | 55/487 X |
| 4,050,237 | 9/1977 | Pall et al. | 55/486 X |
| 4,086,070 | 4/1978 | Argo et al. | 55/97 |
| 4,160,684 | 7/1979 | Berger, Jr. et al. | 55/487 X |
| 4,212,733 | 7/1980 | Goto et al. | 210/505 X |
| 4,231,768 | 11/1980 | Seibert et al. | 55/179 |
| 4,508,775 | 4/1985 | Adiletta | 55/158 X |
| 4,759,782 | 7/1988 | Miller et al. | 55/527 X |

FOREIGN PATENT DOCUMENTS

| | | |
|---|---|---|
| 1014882 | 12/1965 | United Kingdom . |
| 1345155 | 1/1974 | United Kingdom . |
| 1393359 | 5/1975 | United Kingdom . |
| 1544822 | 4/1979 | United Kingdom . |
| 1603519 | 11/1981 | United Kingdom . |
| 2177019 | 1/1987 | United Kingdom . |
| 88/06058 | 8/1988 | World Int. Prop. O. . |

OTHER PUBLICATIONS

American SOciety for Testing and Materials (ASTM D 1986-1971); pp. 1-6; Standad Method for "Evaluation of Air Assay Media by the Monodisperse DOP (Dioctyl Phthalate) Smoke test".

Primary Examiner—Richard L. Chiesa
Attorney, Agent, or Firm—Oblon, Spivak, McClelland, Maier & Neustadt

[57] ABSTRACT

A filter and filtering process for coalescing droplets of atomized oil in a stream of gas includes an oil coalescing layer (14) of e.g. glass microfibres and a second layer (18) of felt or foam downstream of the coalescing layer (14). The drainage layer is impregnated with a fluorocarbon to reduce oil carry-over.

20 Claims, 3 Drawing Sheets

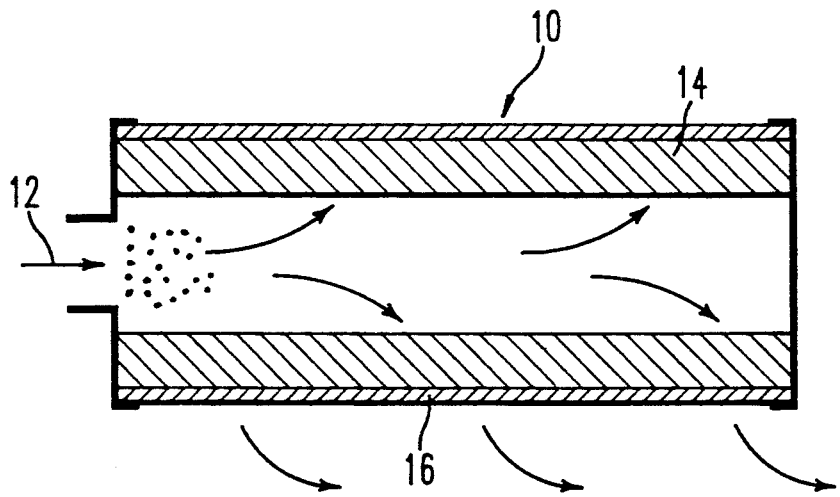
FIG. 1
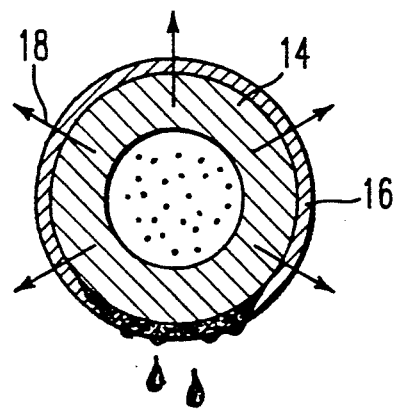
FIG. 2
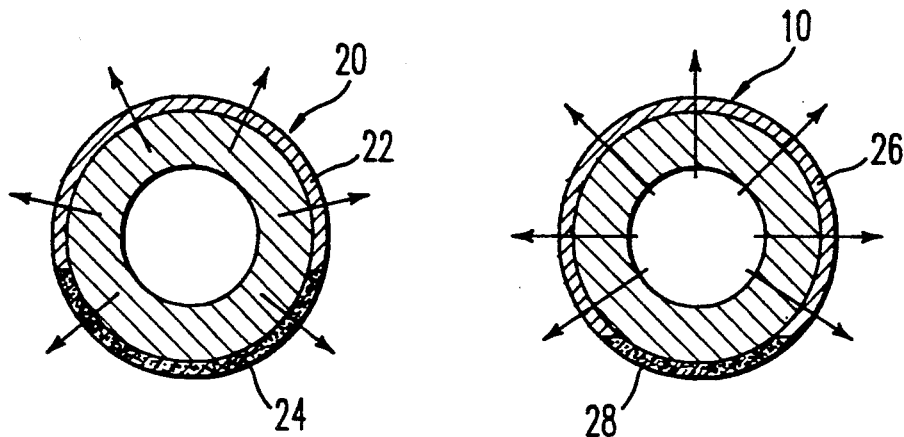
FIG. 3
PRIOR ART
FIG. 4

OIL COALESCING FILTER AND FILTERING PROCESS

This application is a continuation of application Ser. No. 07/555,457, filed as PCT/GB89/00182, Feb. 16, 1989, now abandoned.

FIELD OF THE INVENTION

This invention relates to improved separators for the removal of oil droplets from an airstream, for example from an oil-lubricated compressor or vacuum pump.

BACKGROUND OF THE INVENTION

Popular kinds of compressor or vacuum pump have sliding vanes or screws that are lubricated with oil. The oil is used to seal the working faces of the compressor or pump to allow a more efficient compression cycle. Because of the action of the machine, it is inevitable that a finely divided mist of oil droplets will enter the air stream after the compression cycle. Consequently oil appears downstream of the compressor or vacuum pump in the form of an aerosol whose particle size has been found to range between 0.01 and 5 microns. Primary oil separation is normally effected by impingement of the air stream onto a surface, for example using a series of baffles or using a spinner mechanism as shown in our British Patent Application No. 8703314 and up to 95% of the entrained oil can be removed in this way. The air containing the residual oil aerosol passes to a coalescing filter for a second stage of oil removal.

Coalescing filters for secondary oil separation are usually tubular and generally have a coalescing layer which fits within or has within it (depending on the direction of flow) a drainage sleeve, the oil draining from the sleeve which is necessarily of a much coarser nature. Such a filter will desirably combine a minimum resistance to air through flow with a minimum oil carry-over.

SUMMARY OF THE INVENTION

It has now surprisingly been found that the oil carry-over from a coalescing filter is significantly reduced by impregnating or otherwise treating the drainage layer of the cartridge with a material that imparts oil repellancy thereto e.g. a fluorocarbon material.

Accordingly the invention provides a filter for coalescing droplets of atomised oil in a stream of gas, comprising an oil coalescing layer of a microfibrous material and a second layer of an oil drainage material located downstream of (and preferably in face to face contact with) the first layer, said drainge layer receiving oil from the coalescing layer and providing a path for oil to flow by gravity from the filter, wherein the drainage layer but not the coalescing layer is impregnated with a low surface energy material which is a fluorocarbon material.

The invention also resides in the use of a coalescing filter as aforesaid for removing oil aerosol from an airstream.

One of the reasons for the significantly lower oil carry-over consequent on the use of the fluorocarbon or other oil repellant material is believed to be a greater degree of physical separation between the draining oil and the escaping air. When used with a compressor or vacuum pump it is usual practice for the pump manufacturer to employ the coalescing filter in a filter chamber having a generally horizontal axis. A conventional coalescing filter in this attitude is wetted through the depth of its outer sleeve substantially uniformly about its periphery. The effect of the fluorocarbon material in the drainage layer is to modify the surface properties of that layer and make it more oil repellant. Oil enters the drainage layer less easily because it is not wicked into or along the pores or fibres of the layer and its agglomeration is assisted. In the case of a fibrous drainage layer such as LANTOR 7213 H the oil on exposed fibres of the downstream face of the layer has been observed to be drawn off in droplets by the air stream, and this does not occur, or occurs to a markedly reduced extent in the fluorocarbon treated layer employed according to the invention. The reduced oil affinity of the drainage layer causes more rapid oil drainage so that only about the bottom third of the drainage layer is wetted through permitting the oil to drain through a relatively quiescent region of the filter, whereas the air escapes through the relatively dry top two thirds of the filter and is less exposed to entrained oil.

A similar effect has been observed in vertically mounted separators having coalescing and drainage layers in which the drainage layer is treated with an oil repellant material such as a fluorocarbon or a mixture of a fluorocarbon with a silicone or other resin.

The oil coalescing layer which is typically of glass microfibres is desirably of relatively high surface energy so as to hold the droplets of aerosol passing through it and thereby maximize filtration efficiency. If the coalescing layer is coated with a lower surface energy material such as a fluorocarbon, there can be a fall-off of filtration efficiency because the oil or other material is less well held. Thus the oil coalescing layer when moulded from glass microfibres desirably has a binder resin that is not oleophobic, e.g. an epoxy resin or a silicone resin.

For maximum air flow and minimum pressure drop across the filter it is desirable that the filter should contain only a coalescing layer and a drainage layer and that additional layers should be avoided. A mechanical support e.g. a cylinder of expanded metal may be present and is conveniently located between the coalescing and drainage layers. It should offer the minimum practical resistance to air flow and desirably has an open area of at least 65%. The use of fluorocarbon or a mixture of a fluorocarbon with silicone or other resin is desirable when the filter is to be challenged with oil to maximize the oil repellency of the drainage layer.

DESCRIPTION OF PREFERRED FEATURES

The oil coalescing layer may be fabricated or moulded from an inorganic material such as glass microfibres. It should have a structure and pore size such that it will retain particles and droplets having a size from 0.01 to 10 microns, and in particular particles of size less than 1.5 microns which form a major component of the entrained oil from a vacuum pump, with an efficiency of between 99.97 and 99.9999% when subjected to a dioctylphthalate test to ASTM D 1986-1971 (Military Standard 282). It may be formed from layers of sheet wrapped one around the other, formed from pleated sheet, or it may be made by moulding or vacuum forming. It may be unimpregnated with binder, in which case it is normally supported by a fabric which prevents migration of the medium. Alternatively it may be impregnated with a resin binder which imparts hydrophobic and oleophilic properties and a degree of mechanical strength.

Suitable media for the coalescing layer include microfibrous filter papers and filter tubes as described in patent specifications No. GB-A-1014882 (Domnick Hunter), and GB-1544822, GB-A1603519. (both Process Scientific Innovations). In particular, it may be a filter tube moulded from borosilicate glass microfibres. Media suitable for use in cartridges are available from Evans Adlard of Winchcombe, England; Binzer of West Germany and Lydall, Dexter & Holingsworth, and Vose in the USA. Cartridges containing various grades of suitable coalescing media are available from Mann & Hummel of West Germany; Airmaze and their licensees Locker Airmaze of Cleveland, Ohio, USA; Domnick Hunter, Birtley, England and Technalab of the USA.

Outer sleeves for use as the drainage layer may be made from a felt of polyester or other synthetic fibre material or a reticulated plastics foam. The drainage layer may be of an open-pore plastics such as polyester, polyethylene or polyurethane foam impregnated with fluorocarbon material. To date, foams have given superior oil carry-over performance, but they exhibit shortcomings in elevated temperature duty and are normally considered only for use with vacuum pumps. Polyester felts have service temperatures of up to 150–180 degrees C., which is ideal for compressors and is becoming increasingly demanded for vacuum pumps, but their oil separation performance is not as good as foam. It is an advantage of the invention that the performance of a felt can be made equal to or better than that of a foam from the oil coalescing standpoint whilst retaining the advantageous temperature resistance of the felt. An untreated polyester felt may give an oil carry-over from the filter cartridge of 1.5–1.5 mg per cubic meter whereas foam commonly gives an oil carry-over of about 0.5 mg per cubic meter. Fluorocarbon treated polyester felt drainage layers according to the invention have exhibited oil carry-over at normal gas flow rates of 0.2–0.5 mg per cubic meter, with most results lying close to 0.3. In surge conditions it has been noted that the oil carry-over goes into the range of 1–2.8 mg per cubic meter. There may be used a fluorocarbon impregnated polyester felt, for example LANTOR 7213H (Lantor, Bolton, England), which is of fibre diameter 10–20 micrometers held together with a binder and after-treated with fluorocarbon by dipping followed by passage over heated rollers to dry and heat set the fabric, the fabric containing about 1% by weight fluorocarbon. Another suitable material is T 10 T (Webron, Bury, England) which is a polyester felt of fibre diameter 12.4–17.5 micrometers which has been impregnated by dipping with a polymerisable fluorocarbon liquid and hot dried to polymerise and cross link the liquid and give about 5% by weight of fluorocarbon resin solids on the fabric. It is envisaged that the fluorocarbon treatment may also be applicable to reticulated open pore foams typically having 80 pores per inch available from KURETA (West Germany), RECTICEL (Belgium), SCOT (USA) and DECLON (England).

BRIEF DESCRIPTION OF THE DRAWINGS

An embodiment of the invention will now be described, by way of example only, with reference to the accompanying drawings, in which:

FIG. 1 is a diagrammatic view in longitudinal section of a filter cartridge according to the invention and FIG. 2 is a view in transverse section;

FIG. 3 is a diagrammatic transverse section of a filter cartridge showing the extent of wetting with oil in the absence of fluorocarbon treatment according to the invention and FIG. 4 is a diagrammatic transverse section of a filter cartridge according to the invention showing the extent of oil wetting.

DESCRIPTION OF THE PREFERRED EMBODIMENTS

Figure 5:
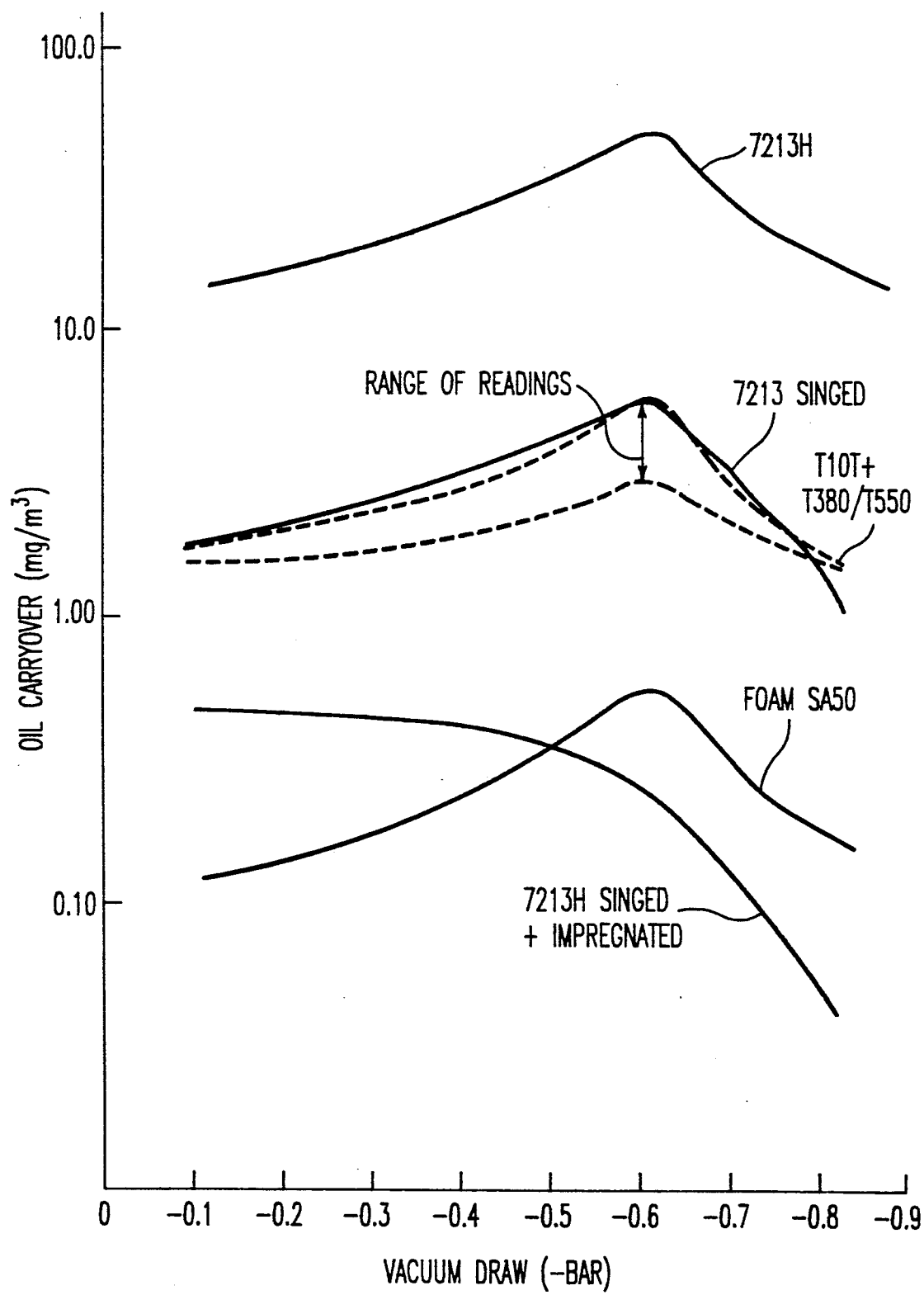
FIGS. 5 and 6 are graphs showing for various filters made according to the invention and various prior art filters the amount of oil carryover in mg/cm$^3$ against pressure across the filter or "vacuum draw" in bars.

In FIG. 1, a filter cartridge 10 in a filter housing (not shown) is supported in a generally horizontal attitude and is challenged with a stream of air from an oil-lubricated compressor or vacuum pump which is typically at 70–90 degrees C. and typically is contaminated with about 400 milligrams per cubic meter of compressor oil. The cartridge 10 has an in-to-out flow direction as shown and comprises an inner tubular body 14 of moulded glass microfibres which coalesce the aerosol droplets (with e.g. 99.999% efficiency to 0.3 um) and an outer sleeve 16 of fluorocarbon treated felt or foam material that acts as a drainage layer. As is apparent from FIG. 2, coalesced oil is stopped by the sleeve 16 from being re-entrained in the air flow 18 leaving the filter 10; and open pores in the sleeve allow oil at an interface between body 14 and sleeve 16 to drain by gravity to the lowest region of the cartridge 10 and drip downwards for return to a sump of the compressor or vacuum pump. As is apparent from FIG. 2 the air-flow 18 is predominantly from an upper region of the cartridge 10 which is not wetted with oil.

In FIG. 3, a cartridge 20 of the construction described above but with a non-fluorocarbon treated drainage layer 22 has a relatively large lower oil-wetted region 24 from which oil may become re-entrained into the air stream by means of bubbling. In FIG. 4, the cartridge 10 has a fluoropolymer coated sleeve 26 in which a significantly smaller oil-wetted area 28 forms, both giving a larger area of the cartridge for oil discharge and a lesser tendency to oil re-contamination of the air stream.

The invention will now be further described with reference to the following Examples.

EXAMPLE 1

The performance of various coalescing layers was assessed in a filter having the same construction and coalescing medium as a PSI RN625 internal separator. That separator is generally as shown in FIG. 1 and employs a tubular microfibre filter element based on borosilicate glass microfibres and made as described in British Patent No. 1603519. The glass microfibres used have diameters of about 0.5 micrometers to 10 micrometers and aspect ratios of 500:1 to 4000:1. The binder employed for the glass microfibres was an epoxide resin. The element was about 10 mm wall thickness and was about 250 mm long. It was supported externally by an integrally moulded mesh of expanded metal having an open area of about 70% to give good air outflow properties and to minimize the working pressure difference across the cartridge. A drainage sleeve was fitted onto and in intimate contact with the outer surface of the mesh support and was, in the case of a felt, ultrasonically seam welded in position. Where foam was used instead of felt, the foam was stitched at a longitudinal seam to form the required outer sleeve. The filters thus had two working layers, an inner coalescing layer and an outer drainage layer.

Various coalescing filters constructed as described above were assessed for their oil carry-over performance using a stream of exhaust air from an oil lubricated rotary vacuum pump having an aerosol particle diameter of about 0.6 micrometers which was passed through a filter according to the invention and then impinged onto high efficiency glass filter paper to entrap carry-over oil. The temperature of the exhausting air was 60° to 70° C. and the flow rate was up to 100 cubic meters per hour at zero vacuum draw when creating a vacuum against a valve, the flow decreasing to zero as the valve was closed. Oil which was trapped by the filter paper was then extracted by means of a solvent and analyzed quantitatively using an infra-red spectrophotometer. The oil carry-over from a filter cartridge having a particular drainage material was found to depend upon the velocity of the air through it, and tests were carried out at various vacuum draws to asses this effect. Typical peak carry-over figures were as follows:

| Source | Material | Carry-over mg/cubic meter |
| --- | --- | --- |
| FELTS | | |
| LANTOR | 7213H | 50 |
| WEBRON | T10T | 1.5–4 |
| EDWARD W ANDREWS | T380/T550 | 1.5–5 |
| FOAMS | | |
| RECTICEL | SA 50 | 0.5 |
| KURETA | SF35 | 0.5 |
| " | SF35 | 0.5 |

A singeing treatment may be carried out on the material of a fabric drainage layer for the purpose of removing surface fibre on the fabric; the improvement in oil carry-over is seen in FIG. 5 to be an order of magnitude.

EXAMPLE 2

Figure 6:
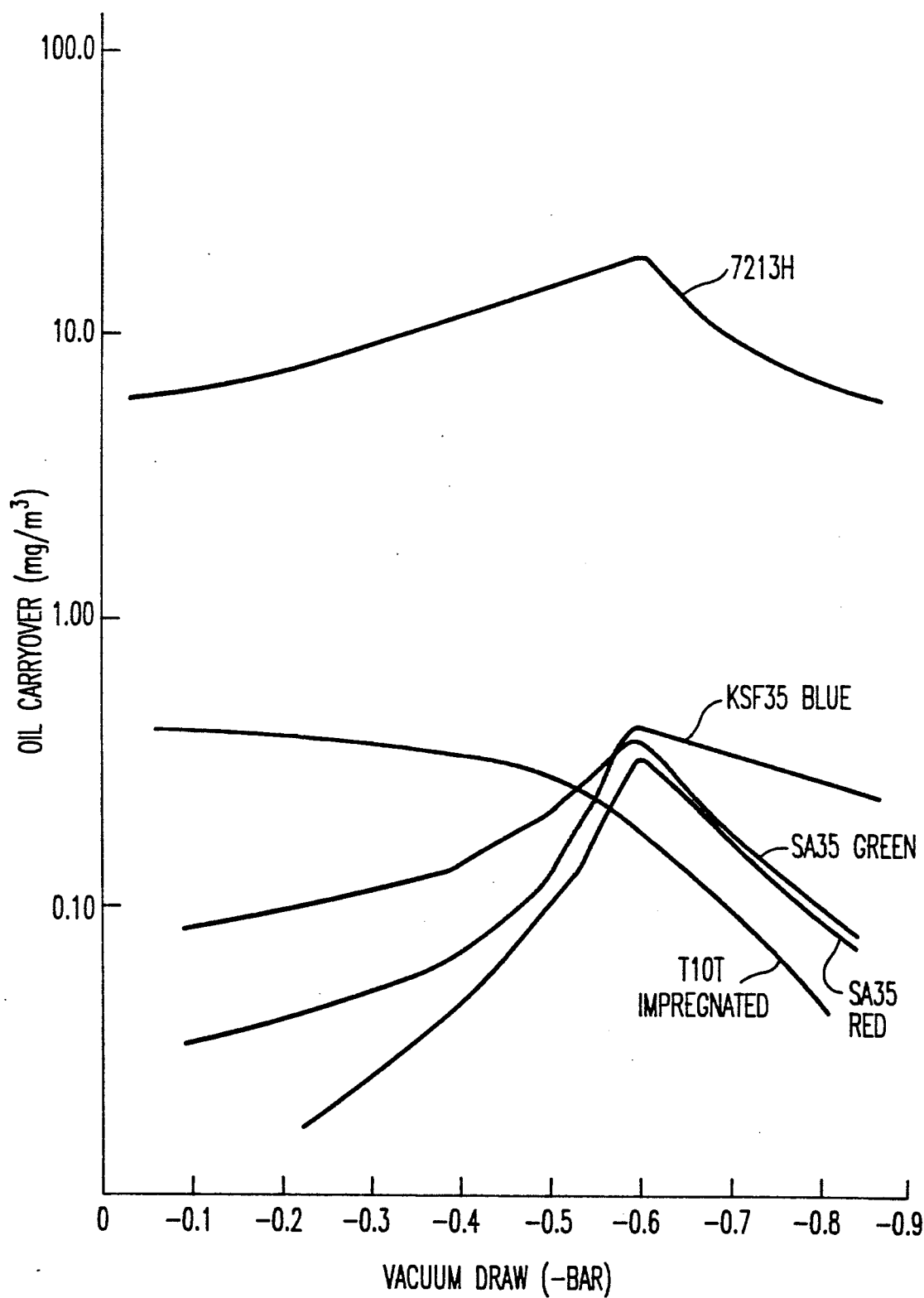

The procedure of Example 1 was used to obtain curves for oil carry-over as a function of vacuum draw in oil from a BUSCH R5/100 (Maulburg, West Germany) rotary vane vacuum pump using a filter as described in Example 1 and as a drainage layer the indicated material. It will be noted from FIG. 5 that the singed fluorocarbon impregnated version of polyester felt 7213H exhibited an oil-over of less than 0.5 mg per cubic meter at a vacuum draw of −0.2 bar which fell progressively and sharply with increasing vacuum draw and above −0.5 bar was better than an unimpregnated foam material SA50. In FIG. 6, the T10T material is seen to give a similar performance using a LEYBOLD HEREAUS vacuum pump (Bourg Les Valence, France). The filter elements used were similar to those described in Example 1.

We claim:

1. A filter for coalescing droplets of atomized oil in an airstream, comprising an oil coalescing layer of a microfibrous material and a second layer of a macroporous oil drainage material located downstream of the coalescing layer, said drainage layer receiving oil from the coalescing layer, impeding reentrainment of oil in an air flow leaving the filter, and providing a path through the drainage layer for oil to flow by gravity from the filter, wherein the drainage layer but not the coalescing layer is impregnated with a low surface energy material which is a fluorocarbon, the fluorocarbon serving to reduce an oil wetted area of the drainage layer, whereby there is a reduced tendency to oil re-contamination of the airstream.

2. A filter according to claim 1, wherein the oil coalescing layer and the second layer are in face to face contact either directly or through an intervening partly open mechanical support.

3. A filter according to claim 1 or 2, which is tubular and has a coalescing layer which fits within or has within it depending on the direction of flow a drainage sleeve, coalesced oil draining from the sleeve which is of a coarser porosity than the coalescing layer.

4. A filter according to claim 1 or 2, wherein the coalescing layer is fabricated or molded from an inorganic material and has a structure and pore size such that it will retain particles and droplets having a size from 0.01 to 10 microns with an efficiency of between 99.97 and 99.9999% when tested in accordance with Military Standard 282.

5. A filter according to claim 4, wherein the coalescing layer is fabricated or molded from glass microfibers.

6. A filter according to claim 1, wherein the coalescing layer is of borosilicate glass microfibres and is formed from layers of sheet wrapped one around the other, formed from pleated sheet, made by moulding or vacuum forming.

7. A filter according to claim 1, wherein the drainage layer is of a polyester fabric.

8. A filter according to claim 7, wherein the fluorocarbon material is present in an amount of 1–5% by weight based on the weight of the polyester fabric.

9. A filter according to claim 1, wherein the drainage layer is of an open-pore plastics selected from the group consisting of polyester, polyethylene and polyurethane foam.

10. A process for removing an oil aerosol from an airstream by passing said airstream through a coalescing filter comprising the steps of:
supplying an airstream containing atomized oil;
passing said airstream through an oil coalescing layer of the filter, said oil coalescing layer comprising a microfibrous material which is not impregnated with a fluorocarbon;
passing said airstream through a macroporous drainage layer of the filter, said drainage layer being downstream of said coalescing layer and comprising an oil drainage material which is impregnated with a fluorocarbon; and
providing a flow path through the drainage layer for oil to flow by gravity from the filter.

11. The process according to claim 10, further comprising the step of:
impinging the airstream against a surface located upstream of said coalescing filter, so that a major proportion of the oil originally present in the airstream coalesces on said surface before the airstream enters the coalescing filter.

12. A process for removing oil from an airstream containing oil in the form of an aerosol comprising the steps of:
passing said airstream through a filter in which droplets of atomized oil in the airstream coalesce, said filter comprising an oil coalescing layer of a microfibrous material and a second layer of a macroporous oil drainage material located downstream of the oil coalescing layer, said drainage layer receiving oil from the coalescing layer and providing a path through the drainage layer for oil to flow by gravity from the filter, wherein the drainage layer but not the coalescing layer is impregnated with a low surface energy material which is a fluorocarbon, the effect of the fluorocarbon material in the drainage layer being to reduce the proportion of the drainage layer that is wetted through and to reduce oil carry-over.

13. The process as claimed in claim 12, further comprising the step of supporting said filter with its axis generally horizontal.

14. A filter for coalescing droplets of atomized oil in an airstream, comprising an oil coalescing layer of a microfibrous material and a second layer of a macroporous oil drainage material located downstream of the coalescing layer, said drainage layer receiving oil from the coalescing layer and providing a path through the drainage layer for oil to flow by gravity from the filter, wherein the drainage layer but not the coalescing layer is impregnated with a low surface energy material which is a fluorocarbon, wherein the coalescing layer has a structure and pore size such that it will retain particles and droplets having a size from 0.01 to 10 microns with an efficiency of between 99.97 and 99.9999% when tested in accordance with Military Standard 282, and wherein the drainage layer comprises a material having a pore size of a much coarser nature than the pore size of the coalescing layer.

15. A process for removing an oil aerosol from an airstream by passing said airstream through a coalescing filter comprising the steps of:

supplying an airstream containing atomized oil;

passing said airstream through an oil coalescing layer of the filter, said oil coalescing layer comprising a microfibrous material which is not impregnated with a fluorocarbon;

passing said airstream through a macroporous drainage layer of the filter, said drainage layer being downstream of said coalescing layer and comprising an oil drainage material which is impregnated with a fluorocarbon; and providing a flow path through the drainage layer for oil to flow by gravity from the filter;

wherein the coalescing layer has a structure and pore size such that it will retain particles and droplets having a size from 0.01 to 10 microns with an efficiency of between 99.97 and 99.9999% when tested in accordance with Military Standard 282; and wherein said oil drainage material comprises a material having a pore size of a much coarser nature than the pore size of the coalescing layer.

16. A process for removing oil from an airstream containing oil in the form of an aerosol comprising the steps of:

passing said airstream through a filter in which droplets of atomized oil in the airstream coalesce, said filter comprising an oil coalescing layer of a microfibrous material and a second layer of a macroporous oil drainage material located downstream of the oil coalescing layer, said drainage layer receiving oil from the coalescing layer and providing a path through the drainage layer for oil to flow by gravity from the filter, wherein the drainage layer but not the coalescing layer is impregnated with a low surface energy material which is a fluorocarbon, the effect of the fluorocarbon material in the drainage layer being to reduce the proportion of the drainage layer that is wetted through and to reduce oil carry-over, wherein the coalescing layer has a structure and pore size such that it will retain particles and droplets having a size from 0.01 to 10 microns with an efficiency of between 99.97 and 99.9999% when tested in accordance with Military Standard 282, and wherein said drainage layer comprises a material having a pore size of a much coarser nature than the pore size of the coalescing layer.

17. A filter for coalescing droplets of atomized oil in a stream of gas, comprising an oil coalescing layer of a microfibrous material and a second layer of a macroporous oil drainage material located downstream of the coalescing layer, said drainage layer receiving oil from the coalescing layer and providing a path through the drainage layer for oil to flow by gravity from the filter, wherein the drainage layer but not the coalescing layer is impregnated with a low surface energy material which is a fluorocarbon, wherein the coalescing layer has a structure and pore size such that it will retain particles and droplets having a size from 0.01 to 10 microns with an efficiency of between 99.97 and 99.9999% when tested in accordance with Military Standard 282, and wherein the drainage layer includes fibers having a diameter of 10–20 micrometers.

18. A filter for coalescing droplets of atomized oil in a stream of gas, comprising an oil coalescing layer of a microfibrous material and a second layer of a macroporous oil drainage material located downstream of the coalescing layer, said drainage layer receiving oil from the coalescing layer and providing a path through the drainage layer for oil to flow by gravity from the filter, wherein the drainage layer but not the coalescing layer is impregnated with a low surface energy material which is a fluorocarbon, wherein the coalescing layer has a structure and pore size such that it will retain particles and droplets having a size from 0.01 to 10 microns with an efficiency of between 99.97 and 99.9999% when tested in accordance with Military Standard 282, wherein the drainage layer is of an open-pore plastics selected from the group consisting of polyester, polyethylene and polyurethane foam, and wherein the foam has about 80 pores per inch.

19. A process for removing an oil aerosol from an airstream by passing said airstream through a coalescing filter comprising the steps of:

supplying an airstream containing atomized oil;

passing said airstream through an oil coalescing layer of the filter, said oil coalescing layer comprising a microfibrous material which is not impregnated with a fluorocarbon;

passing said airstream through a macroporous drainage layer of the filter, said drainage layer being downstream of said coalescing layer and comprising an oil drainage material which is impregnated with a fluorocarbon; and providing a flow path through the drainage layer for oil to flow by gravity from the filter;

wherein the coalescing layer has a structure and pore size such that it will retain particles and droplets having a size from 0.01 to 10 microns with an efficiency of between 99.97 and 99.9999% when tested in accordance with Military Standard 282; and wherein said oil drainage material includes fibers having a fiber diameter of 10–20 micrometers.

20. A process for removing oil from an airstream containing oil in the form of an aerosol comprising the steps of:

passing said airstream through a filter in which droplets of atomized oil in the airstream coalesce, said filter comprising an oil coalescing layer of a microfibrous material and a second layer of a macroporous oil drainage material located downstream of the oil coalescing layer, said drainage layer receiving oil from the coalescing layer and providing a path through the drainage layer for oil to flow by gravity from the filter, wherein the drainage layer but not the coalescing layer is impregnated with a low surface energy material which is a fluorocarbon, the effect of the fluorocarbon material in the drainage layer being to reduce the proportion of the drainage layer that is wetted through and to reduce oil carry-over, wherein the coalescing layer has a structure and pore size such that it will retain particles and droplets having a size from 0.01 to 10 microns with an efficiency of between 99.97 and 99.9999% when tested in accordance with Military Standard 282, and wherein said drainage layer includes fibers having a fiber diameter of 10–20 micrometers.

* * * * *

UNITED STATES PATENT AND TRADEMARK OFFICE
CERTIFICATE OF CORRECTION

PATENT NO.   :   5,129,923

DATED        :   July 14, 1992

INVENTOR(S)  :   George S. Hunter et al.

It is certified that error appears in the above-identified patent and that said Letters Patent is hereby corrected as shown below:

On the title page:
The Related U.S. Application Data is incorrect, [63], should be, --Continuation of Ser. No. 555,457, Aug. 17, 1990, filed as PCT/GB89/00182, Feb. 16, 1989, abandoned--.

Signed and Sealed this

Fourteenth Day of September, 1993

Attest:

BRUCE LEHMAN

*Attesting Officer*    *Commissioner of Patents and Trademarks*